United States Patent [19]
Rich et al.

[11] Patent Number: 5,629,822
[45] Date of Patent: May 13, 1997

[54] TAPE CASSETTE AND METHOD OF MANUFACTURING A TAPE CASSETTE

[75] Inventors: Richard F. Rich; James R. Roe, both of Warren, Pa.

[73] Assignee: Loran Cassettes and Audio Products, Warren, Pa.

[21] Appl. No.: 344,699

[22] Filed: Nov. 18, 1994

[51] Int. Cl.⁶ .................................................. G11B 23/02
[52] U.S. Cl. .................................................. 360/132
[58] Field of Search ............... 360/132, 130.31–130.33; 242/347, 345.2

[56] References Cited

U.S. PATENT DOCUMENTS

| | | | |
|---|---|---|---|
| 3,642,228 | 2/1972 | Tollkuhn | 242/199 |
| 3,684,203 | 8/1972 | Tollkuhn | 242/67.3 |
| 4,096,538 | 6/1978 | Oishi | 360/132 |
| 4,097,006 | 6/1978 | Saito | 242/199 |
| 4,110,805 | 8/1978 | Oishi | 360/132 |
| 4,126,283 | 11/1978 | Kawachi | 242/199 |
| 4,166,593 | 9/1979 | Milants | 242/199 |
| 4,392,169 | 7/1983 | Boullart et al. | 360/130.33 |
| 4,506,846 | 3/1985 | Gelardi et al. | 242/199 |
| 4,682,258 | 7/1987 | Satoh et al. | 130/132 |
| 4,699,018 | 10/1987 | Oishi et al. | 360/130.21 |
| 4,731,687 | 3/1988 | Kagano et al. | 360/132 |
| 4,735,378 | 4/1988 | Kagano et al. | 242/197 |
| 4,780,782 | 10/1988 | Bordignon | 360/130.31 |
| 4,922,361 | 5/1990 | Bordignon | 360/130.31 |
| 5,086,363 | 2/1992 | Katagiri et al. | 360/132 |
| 5,096,136 | 3/1992 | Sato et al. | 242/199 |

*Primary Examiner*—Stuart S. Levy
*Assistant Examiner*—Allen Cao
*Attorney, Agent, or Firm*—Oliff & Berridge

[57] ABSTRACT

A tape cassette shell has mating base and cover sections and azimuth posts that remain perpendicular with respect to the floor or ceiling of the shell sections during cooling after injection molding. At least two support ribs of substantially equal height are formed symmetrically around each azimuth post. Stress imposed on an azimuth post by one support rib due to contraction of the support rib material during cooling after injection molding is balanced by stress imposed on the azimuth post by other support ribs. As a result, the azimuth post remains substantially perpendicular to the floor or ceiling of the shell section during cooling after injection molding. A spring member having leg portions is mounted on support ribs behind the azimuth posts. The leg portions space the spring member up from the top surface of the support ribs. A family mold for forming at least one of each of the cover and base sections is designed so that each section is comprised of substantially equal amounts of material, and so that the sections are symmetric about a centerline. As a result, the fill time of the family mold, and the stress imposed on the family mold by the injection pressure are minimized.

11 Claims, 5 Drawing Sheets

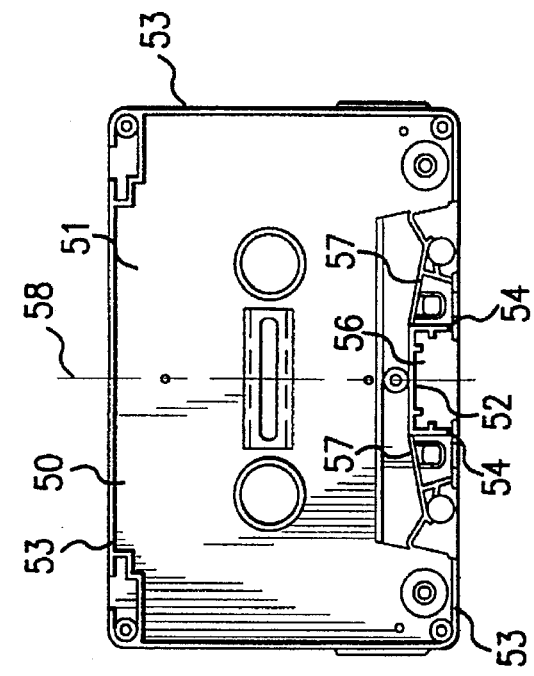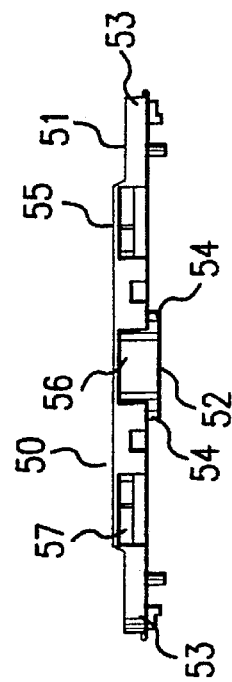
FIG. 8A
FIG. 8B
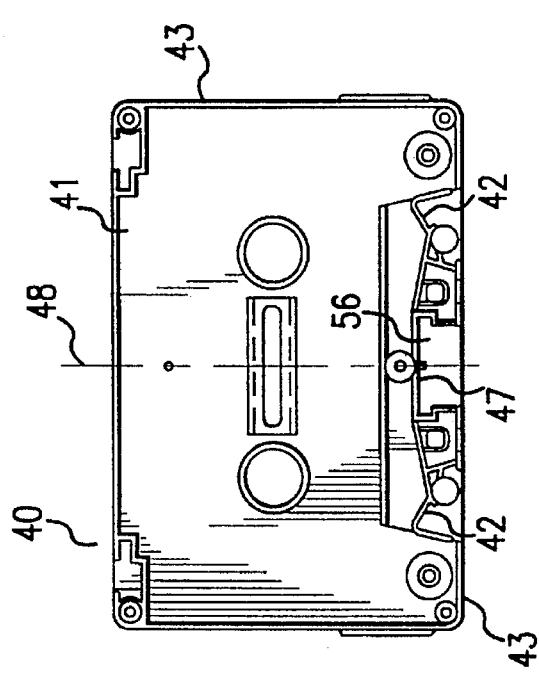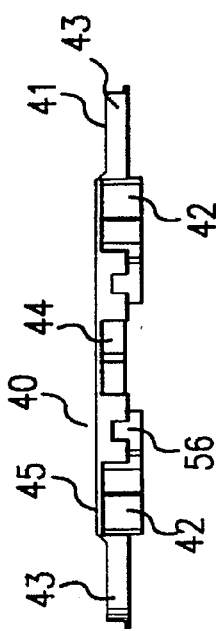
FIG. 7A
FIG. 7B

TAPE CASSETTE AND METHOD OF MANUFACTURING A TAPE CASSETTE

BACKGROUND OF THE INVENTION

1. Field of the Invention

The invention relates to two piece molded tape cassettes, methods of manufacturing two piece molded tape cassettes and a spring member contained in a cassette for pressing a tape against a magnetic head.

2. Description of the Related Art

Tape cassettes shells are generally formed from two sections that are mated together to enclose a tape. The tape is wound around two spools that are mounted in the shell, and a portion of the tape between the spools extends across a head insertion area. Generally the head insertion area is defined by a bracket that is integrally formed with one or both sections of the cassette shell. In addition, azimuth posts are usually formed on either side of the head insertion area to help guide the tape through the head insertion area. The azimuth posts are often connected to, or integrally formed with the bracket, or with support ribs that are intended to support the azimuth posts in an upright position with respect to the floor of the cassette.

FIG. 1 shows a portion of a base section of a prior art tape cassette that includes a bracket 22 defining a head insertion area, azimuth posts 24, front support ribs 28 and rear support ribs 26. The front and rear support ribs 28, 26 are integrally formed with the bracket 22 and the azimuth posts 24.

As shown in FIG. 5, a spring member 30, with a contact pad 34 is usually mounted on the rear support ribs 26, just behind the azimuth posts 24. The portion of the tape between the spools passes over the front support ribs 28, in front of the azimuth posts 24. When a magnetic head is inserted into the head insertion area, the contact pad 24 of the spring member 30 pushes the tape against the magnetic head.

A typical prior art spring member 30 is shown in FIG. 3. The spring member 30 is comprised of a main body portion 32, a contact pad 34 mounted on the main body portion 32, and end portions 36. The spring member 30 is typically formed from a flat piece of thin metal, and the ends 36 are usually bent at approximately a 90° angle to the main body portion 32.

Because the tape passing in front of the azimuth posts must pass over the top surface of the front support ribs 28, and because the contact pad 34 must be centered on the tape to press the entire height of the tape against a magnetic head inserted into the head insertion area, the rear support ribs 26 are formed to have a top surface that is higher off the floor 20 of the base section than the top surface of the front support ribs 28. The higher height of the rear support ribs 26 is necessary to ensure that the contact pad 34 is centered on the tape.

The two sections of the cassette shell are generally formed by injection molding. During molding, a heated liquid resin material is injected into a steel mold under pressure. The molds are often "family molds" that have at least one cavity for forming a base section, and at least one cavity for forming a cover section. After the cavities in the mold are filled with liquid resin, the mold is cooled until the resin solidifies. The solidified resin material is then ejected from the mold, and cooled to room temperature.

The rear support ribs 26 have a greater height, and a greater mass than the front support ribs 28. During cooling of the cassette shell sections the resin material contracts. The contraction of a support rib applies a stress on an azimuth post that tends to pull the azimuth posts toward the support rib. Because the rear support ribs 26 are higher, and have a greater mass, than the front support ribs 28, the stress applied to azimuth posts 24 by the support ribs is unequal. The azimuth posts tend to be pulled backwards toward the rear support ribs 26. As a result, the azimuth posts 24 are not perpendicular to the floor 20, after cooling.

For proper operation of the tape cassette, it is important that the azimuth posts 24 be as perpendicular as possible. Because of the unequal height support ribs, however, the azimuth posts 24 are not perpendicular to the base 20 of the cassette shell.

SUMMARY OF THE INVENTION

It is an object of the present invention to provide a cassette shell section having azimuth posts wherein the azimuth posts remain perpendicular to the floor of the base section during cooling after injection molding.

It is a further object of the present invention to provide a spring member that is mounted on rear support ribs having the same height as front support ribs, and that remains centered on the tape in the head insertion area.

It is still a further object of the present invention to provide a method of injection molding cassette shell sections in a family mold wherein the fill time of the family mold is minimized.

It is a further object of the present invention to provide a method of injection molding cassette shell sections in a family mold such that stress imposed on the family mold during molding is minimized.

These and other objects of the present invention are achieved by forming a mold for a cassette shell base section that includes azimuth posts, wherein support ribs of approximately equal height and mass are formed on opposite sides of each azimuth post. As a result, the stress applied to the azimuth posts by the support ribs during cooling after injection molding is balanced, and the azimuth posts remain perpendicular to the floor of the base section.

A spring member according to the present invention is provided with leg portions that space a main body portion of the spring member (i.e., the portion holding the contact pad) up from a top surface of the support ribs so that the contact pad is centered on the tape in the head insertion area.

A family mold for cassette shell according to the present invention has cavities that contain approximately equal amounts of material, and that are symmetric about a center line. This design minimizes the fill time of the mold, and minimizes the stress imposed on the mold by the injection pressure.

BRIEF DESCRIPTION OF THE DRAWINGS

The invention will be described with reference to the following drawings wherein like elements are identified with like reference numbers, and wherein:

FIGS. 7A and 7B are plan and elevation views, respectively, of a cover section of a cassette shell according to the present invention;

FIGS. 8A and 8B are plan and elevation views, respectively, of a base section of a cassette shell according to the present invention;

DETAILED DESCRIPTION OF PREFERRED EMBODIMENTS

Figure 9:
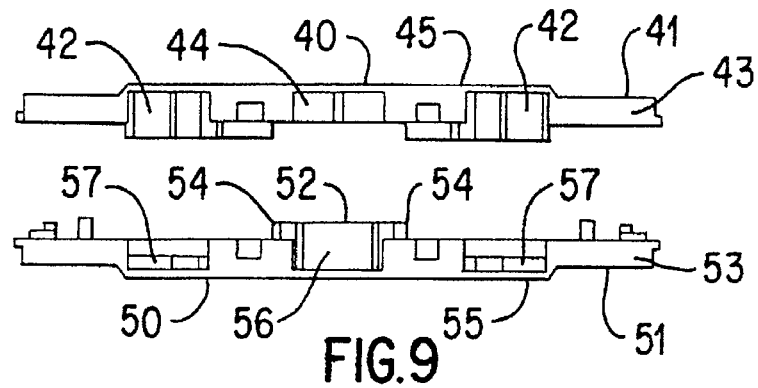
FIG. 9 is an elevation view of a base section and a cover section of a cassette shell according to the present invention.

A preferred embodiment of a two piece cassette shell according to the present invention is shown in FIGS. 7A, 7B, 8A, 8B and 9. As shown in FIG. 9, the cover section 40, shown in FIGS. 7A and 7B, mates with the base section 50, shown in FIGS. 8A and 8B.

As shown in FIGS. 7A and 7B, the cover section 40 has ceiling portions 41 and 45 that are surrounded by a peripheral wall 43. The cover section 40 includes tape guide portions 42 that have a height greater than the peripheral wall 43, and a bracket portion 47 having a height smaller than the peripheral wall 43.

As shown in FIGS. 8A and 8B, the base section has floor portions 51 and 55 that are surrounded by a peripheral wall 53. The base section 50 includes a bracket portion 52 that has a height greater than the peripheral wall 53, and tape guide portions 57 that have a height smaller than the peripheral wall 53.

The cover 40 and the base 50 are mated together as shown in FIG. 9 to form a complete cassette shell that encloses a tape on two spools. The tape guide portions 42 on the cover section 40 mate with the tape guide portions 57 on the base section 50. The bracket portion 52 on the base section 50 mates with the bracket portion 47 on the cover section 40 to form a complete bracket that defines and encloses a head insertion area 56.

A section of the tape between the spools passes along the inside of the peripheral walls 43, 53 adjacent the tape guides 42, 57, and the bracket 52, 47. As shown in FIGS. 7B, 8B and 9, openings in the peripheral walls 43 and 53 of the cover section 40 and base section 50 define a rectangular aperture aligned with the bracket portions 52, 47. The aperture allows a magnetic head to be inserted into the head insertion area 56.

Figure 11:
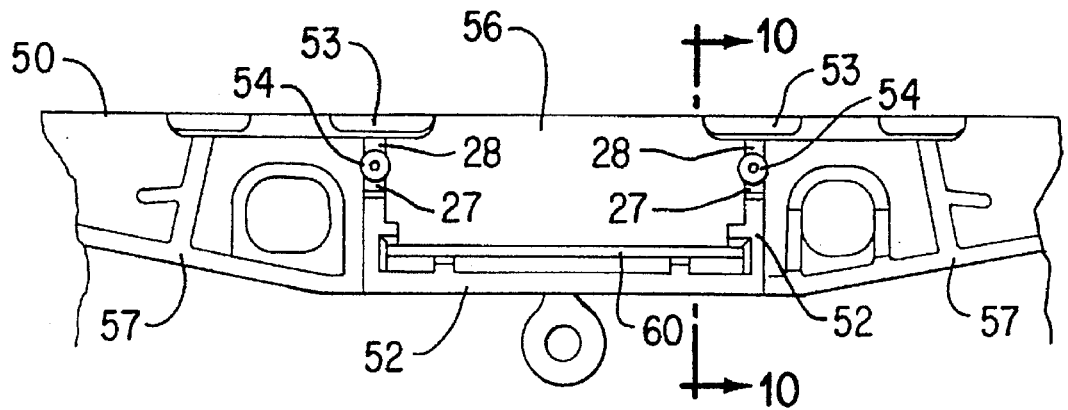
FIG. 11 is a plan view of a portion of a base section of a cassette shell according to the present invention including a head insertion area, a bracket, azimuth posts, and support ribs.

FIG. 11 shows the bracket portion 52 on the base section 50 of a cassette shell in greater detail. Two azimuth posts 54 are integrally formed with front support ribs 28 and rear support ribs 27. The tape section between the two spools passes between the peripheral wall 53 and the azimuth posts 54, and over a top surface of the front support ribs 28. The front support ribs 28 must be low enough so that they do not interfere with the tape. A magnetic shield 60 may also be mounted in the head insertion area 56 to protect the tape on the spools from magnetic fields generated by the magnetic head during recording.

Figure 10:
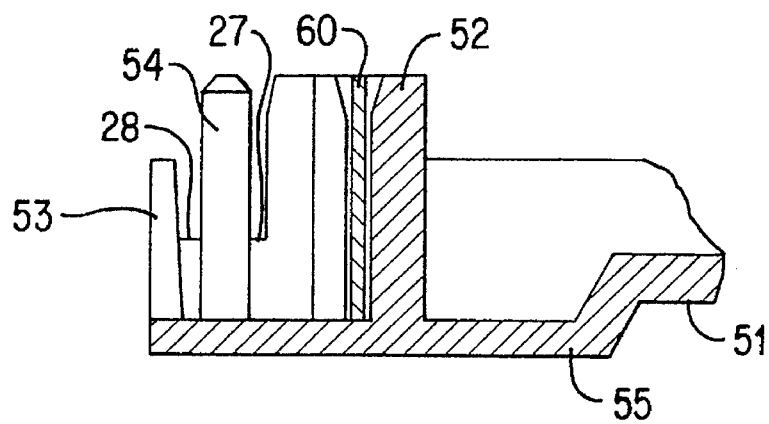
FIG. 10 is a sectional view of a portion of a base section of a cassette shell according to the present invention.

FIG. 10 shows a sectional view of a portion of the head insertion area along line 10—10 of FIG. 11. As seen in FIG. 10, the front support ribs 28 have a height that is equal to the rear support ribs 27.

It should be noted that all of the azimuth posts need not be formed on the base section of the cassette shell. One azimuth post could be formed on the base section, and one azimuth post could be formed on the cover section. Alternately, both azimuth posts could be formed on the cover section.

In addition, more than two support ribs could be symmetrically arranged about each azimuth post. So long as the support ribs are arranged symmetrically around the azimuth post, and each support rib has substantially the same height and mass, the azimuth post will not be pulled toward any one support rib during cooling after injection molding, and the azimuth post will remain perpendicular with respect to the floor or ceiling of the shell sections.

Figure 1:
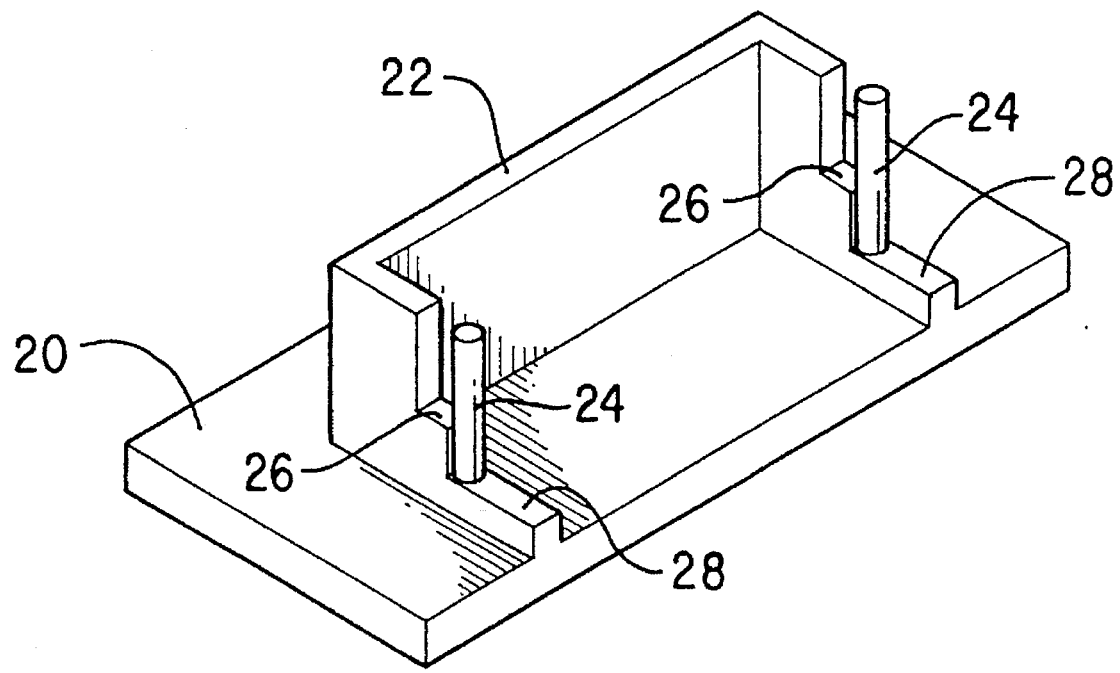
FIG. 1 is a perspective view of a portion of a base section of a prior art cassette shell that includes a bracket surrounding a head insertion area, and azimuth posts.
Figure 2:
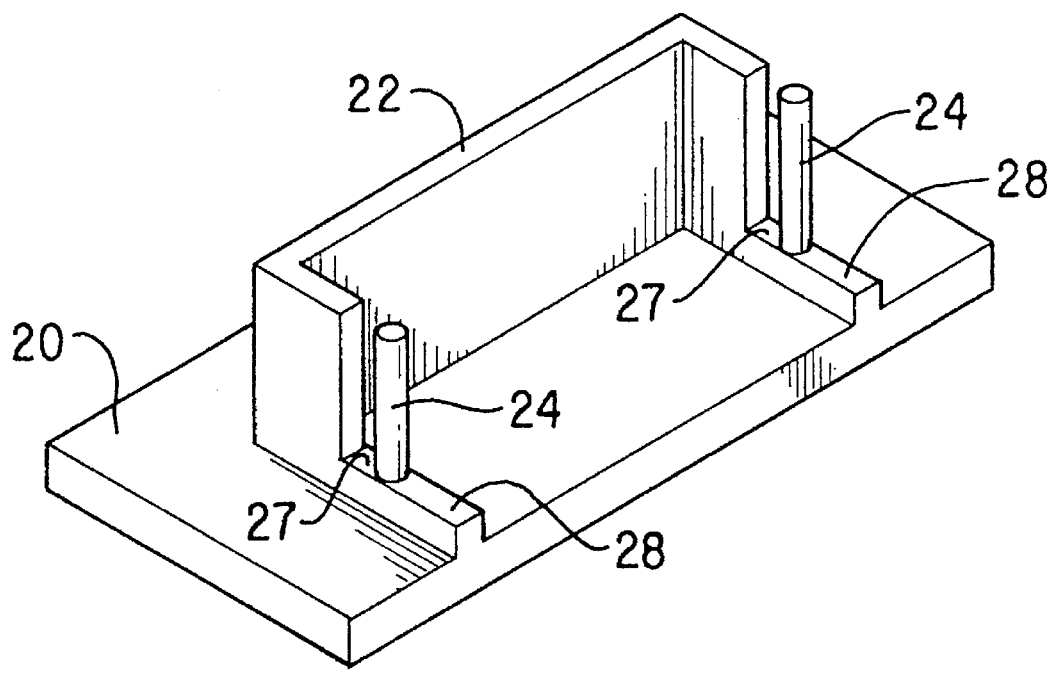
FIG. 2 is a perspective view of a portion of a base section of a cassette shell according to the present invention that includes a bracket defining a head insertion area, and azimuth posts.
Figure 3:
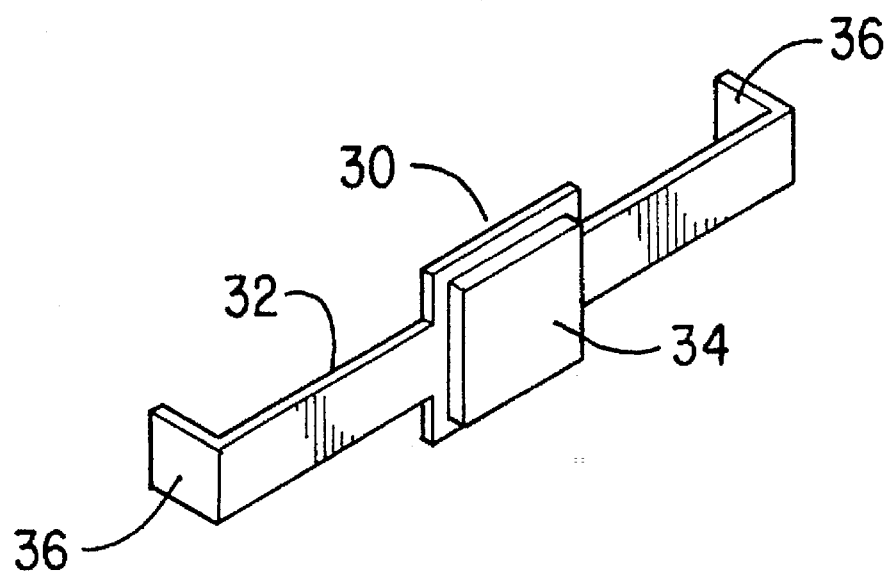
FIG. 3 is a perspective view of a prior art spring member.

A spring member is provided behind the tape in the head insertion area to press the tape against a magnetic head inserted in the head insertion area 56, during recording or playback of the tape. If a prior art spring member 30, as shown in FIG. 3, were mounted on the rear support ribs 27, the contact pad 34 would be too low to press the full height of the tape against the magnetic head.

Figure 4:
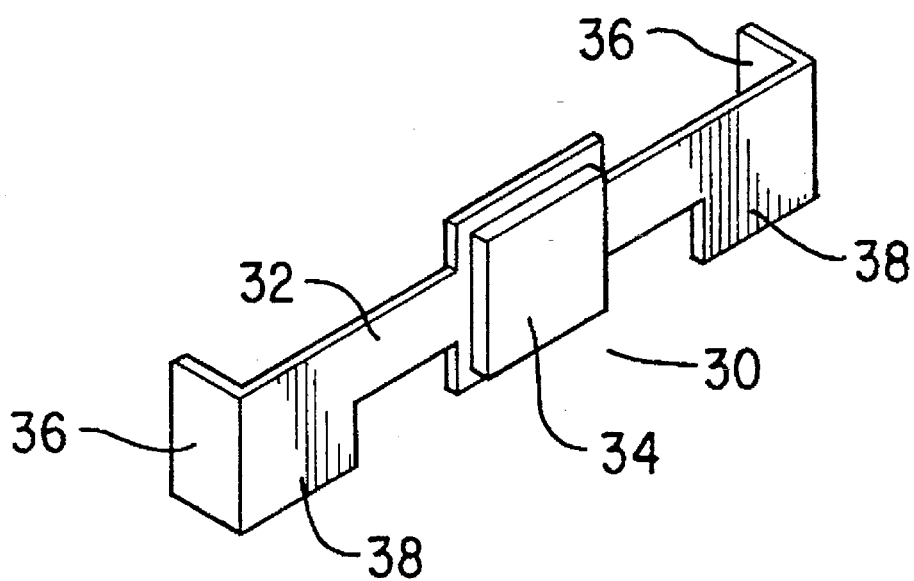
FIG. 4 is a perspective view of a spring member according to the present invention.
Figure 5:
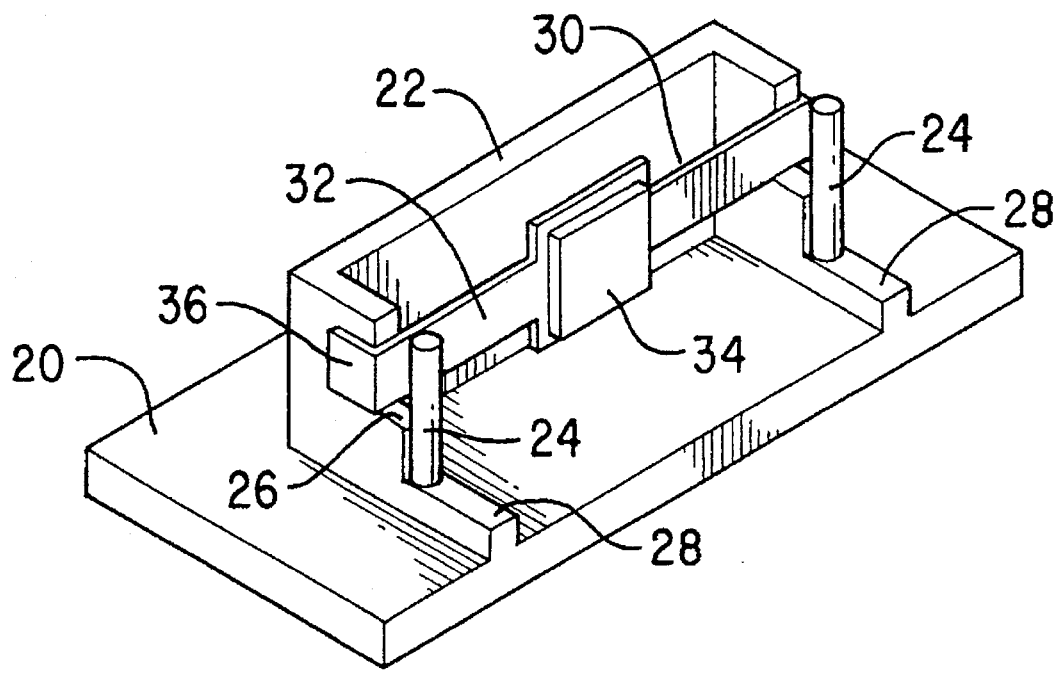
FIG. 5 is a perspective view of a portion of a base section of a prior art cassette shell showing a spring member mounted on rear support ribs in a head insertion area.
Figure 6:
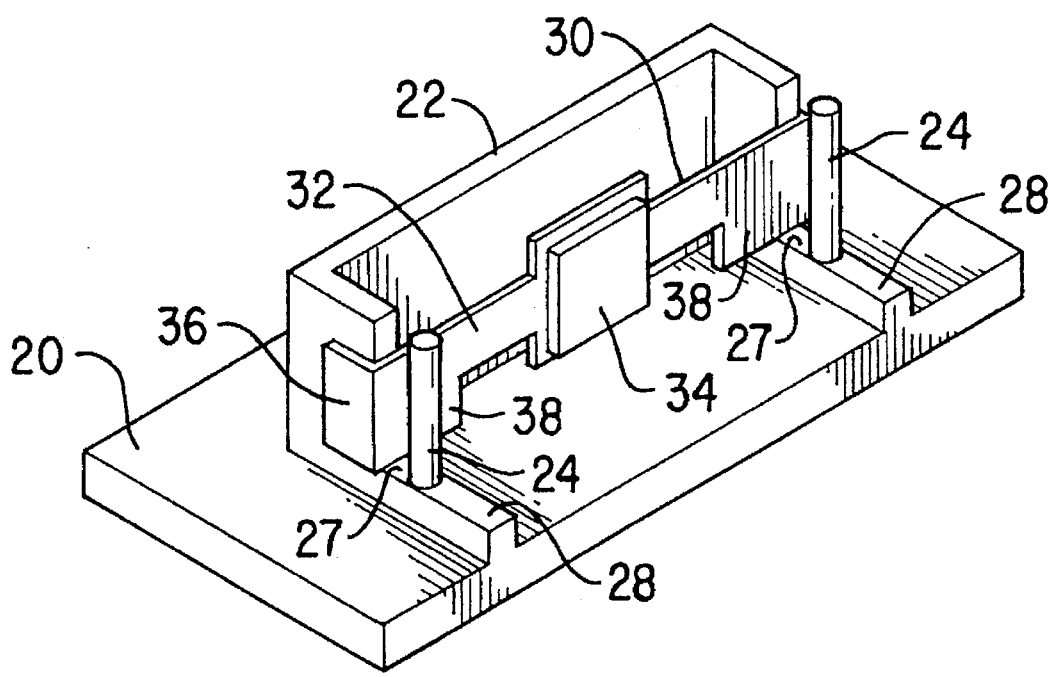
FIG. 6 is a perspective view of a portion of a base section of a cassette shell according to the present invention including a spring member mounted on rear support ribs in a head insertion area.

A spring member 30 according to the present invention is shown in FIG. 4. The spring member 30 incorporates leg portions 38. When the spring member shown in FIG. 4 is mounted in a base section having front and rear support ribs of equal height, as shown in FIG. 6, the legs 38 space the contact pad 34 up from the top surface of the rear support ribs 27 so that the contact pad 38 is centered on the tape.

As mentioned above, the cover section 40 and the base section 50 of the cassette shell shown in FIGS. 7A-7B, 8A-8B, 9, 10 and 11, can be formed by injection molding using a family mold. During molding, a heated liquid resin material is injected, under pressure, into cavities in the mold corresponding to base and cover sections. Once the cavities are filled, the pressure is removed, and the mold is cooled until the resin solidifies. After the resin has solidified, the shell sections are ejected from the mold and cooled to room temperature.

During cooling of the shell sections after ejection from the mold, the resin material contracts. Because the forward support ribs 28 and the rear support ribs 27 on each side of the azimuth posts 54 have substantially the same height and mass, they will contract substantially the same amount and at substantially the same rate. During cooling, any stress imposed on one side of an azimuth post 54 by a rear support rib 27, is balanced by a substantially equal stress imposed on the other side of the azimuth post 54 by a front support rib 28. As a result, the azimuth post 54 remain perpendicular to the floor portions 51, 55 of the base 50 during cooling.

If all cavities of a family mold are filled at the same fill rate (i.e., the same pressure is applied to the material being injected into all cavities), the amount of time required to fill the family mold can be minimized by designing the mold so that the amount of material required to fill a base section cavity is substantially equal to the amount of material required to fill a cover section cavity.

If a first cavity requires less material than a second cavity, then the first cavity will become full before the second cavity, and the first cavity will have to wait until the second cavity becomes full before the cooling process can begin. If both sections require equal amounts of material, each cavity becomes full at the same time, and neither cavity must wait for the other cavity to fill. Assuming it will always require the same amount of material to make the complete cassette, by designing the shell sections so that each section requires the same amount of material, the fill time of the mold is minimized.

In the same manner, if the shell sections are designed so that they are symmetrical about a centerline 48 (FIG. 7A) and 58 (FIG. 8A), then filling the cavities from the center, or from opposite ends of the cavity about the centerline will minimize the fill time of the cavities. If the cavities are not symmetric, and the cavities are filled from the center or opposite ends, then one side of a cavity will become full before the other and additional time will be required to completely fill the cavity. On the other hand, when the cavities are symmetric, each side of a cavity will become full at the same time, and the fill time is minimized.

In addition, if a first cavity is smaller than a second cavity, the first cavity will fill first, and the injection pressure (which is quite high in some applications) will be applied to the interior surfaces of the first cavity while the second cavity is still filling. This pressure is detrimental to the mold and reduces the life of the mold.

To eliminate or reduce the foregoing problems, a family mold for producing base and cover sections according to the present invention is designed so that the cover section is comprised of substantially the same amount of material as the base section, and so that each section is symmetric about a centerline.

Because the spring member 30 is mounted on the rear support ribs 27 between the azimuth posts 54 and the bracket 22, and because a magnetic shield may be mounted on the bracket 22, it is easier to assemble the cassette shell if the azimuth posts 54 and bracket 22 are high enough to fully support the spring member 30 and the magnetic shield 60 until the cover section 40 can be mated to the base section 50 to form a complete shell.

In addition, forming each azimuth post 54 as one piece on the base section 50 is easier than attempting to form each azimuth post from two parts, one on the cover section 40, and one on the base section 50, because a two piece azimuth post design would require that the two pieces be almost perfectly aligned. For the above mentioned reasons, a base section of a cassette shell according to the present invention is designed to incorporate all of the azimuth posts 54, and substantially the entire height of the bracket 52.

To balance the material requirements of the cover and base sections, the cover section 40 is designed to incorporate the majority of the tape guides. The tape guide portions 42 on he cover section 40 are designed to have a height such that the amount of material required to form the cover section 40, is substantially equal to the amount of material required to form the base section 50.

When a family mold according to the present invention is used to manufacture base and cover sections, the fill time of the mold is minimized, and productivity is maximized. In addition, the stress applied to the mold by the injection pressure is minimized, and mold life is maximized.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A tape cassette containing a tape for passage relative to a magnetic head, the tape cassette comprising:

a base having a peripheral wall surrounding a floor;

a cover having a peripheral wall surrounding a ceiling, the peripheral walls of the base and cover mating to enclose the tape between the base and cover, the tape being supported on two spools with a portion of the tape between the spools extending along an interior portion of the mated peripheral walls of the base and cover;

a head intrusion area defined by openings in the peripheral walls of the base and cover, the tape being exposed to the magnetic head in the head intrusion area;

a bracket integrally formed with the base and cover to surround the head intrusion area, the tape passing between the bracket and the openings in the peripheral walls of the base and cover;

at least two azimuth posts integrally formed with one of the base and the cover on opposite sides of the head intrusion area, the azimuth posts being substantially perpendicular to the floor and ceiling of the base and cover, respectively, the azimuth posts guiding the tape through the head intrusion area; and at least two support ribs integrally formed with each corresponding azimuth post, a first support rib of the at least two support ribs being located between the bracket and the corresponding azimuth post and a second support rib of the at least two support ribs being located between the corresponding azimuth post and the peripheral wall such that the first and second support ribs are arranged symmetrically about the azimuth post, each of the first and second support ribs having the same mass and height as measured from the floor of the base to a top surface of the support ribs; wherein said first and second support ribs maintain each of said azimuth posts perpendicular to the floor of said base or ceiling of said cover of the tape cassette.

2. The device of claim 1, wherein the base and the cover are comprised of substantially equal amounts of material.

3. The device of claim 2, wherein the base and cover are symmetric about a centerline passing through the cassette in a direction parallel to the floor and ceiling, and centrally between the spools, the centerline being perpendicular to the portion of the tape between the spools.

4. The device of claim 1, further comprising:

tape guides on opposite sides of the head intrusion area, portions of the tape guides integrally formed with the base and cover so that when the peripheral walls of the base and cover are mated, the portions of the tape guides mate to form complete tape guides located on either side of said bracket.

5. The device of claim 4, wherein substantially all of the tape guides are integrally formed with one of the base and cover, and wherein substantially the entire bracket is integrally formed with an other of the base and cover opposite the base or cover in which the tape guides are integrally formed.

6. The device of claim 5, wherein the base and cover are comprised of substantially equal amounts of material.

7. The device of claim 6, wherein each of the first and second sections are symmetric about a centerline passing through the center of said bracket.

8. The device of claim 1, wherein the at least two azimuth posts comprise first and second azimuth posts, and the at least two support ribs for each of the first and second azimuth posts include the first and second support ribs; and further comprising:

a spring member for pressing a portion of the tape in the head intrusion area against a magnetic head when the magnetic head is inserted into the head intrusion area, the spring member being supported by the first support ribs integrally formed with the first and second azimuth posts, the spring member being located on a side of the first and second azimuth posts opposite the openings in the peripheral walls of the base and cover, the spring member comprising:

a main body portion extending between the first support ribs integrally formed with the first and second azimuth posts and supporting a contact pad; and leg portions, contacting the top surfaces of the first support ribs for spacing the main body portion away from a top surface of the first support ribs.

9. The device of claim 8, wherein the spring member further comprises end portions that extend out from the plane of the main body portion and contact first and second portions of the bracket to hold the spring member stationary within the cassette.

10. The device of claim 9, wherein the end portions extend out perpendicularly from a plane of the main body portion.

11. A tape cassette containing a tape for passage relative to a magnetic head, the tape cassette comprising:

a base having a peripheral wall surrounding a floor;

a cover having a peripheral wall surrounding a ceiling, the peripheral walls of the base and cover mating to enclose the tape between the base and cover, the tape being supported on two spools with a portion of the tape between the spools extending along an interior portion of the mated peripheral walls of the base and cover;

a head intrusion area defined by openings in the peripheral walls of the base and cover, the tape being exposed to the magnetic head in the head intrusion area;

a bracket integrally formed with the base and cover to surround the head intrusion area, the tape passing between the bracket and the openings in the peripheral walls of the base and cover; and tape guides integrally formed with the base and cover on opposite sides of the bracket, the tape guides guiding the tape;

wherein the base and the cover are comprised of substantially equal amounts of material, and wherein the base and cover are symmetric about a centerline passing through the cassette in a direction parallel to the floor and ceiling and centrally between the spools, the centerline being perpendicular to the portion of the tape between the spools;

wherein said tape guides comprise:

at least two azimuth posts integrally formed with one of the base and the cover on opposite sides of the head intrusion area, the azimuth posts being substantially perpendicular to the floor and ceiling of the base and cover, respectively, the azimuth posts guiding the tape through the head intrusion area; and at least two support ribs integrally formed with each corresponding azimuth post, a first support rib of the at least two support ribs being located between the bracket and the corresponding azimuth post and a second support rib of the at least two support ribs being located between the corresponding azimuth post and the peripheral wall such that the first and second support ribs are arranged symmetrically about the azimuth post, each of the first and second support ribs having the same mass and height as measured from the floor of the base to a top surface of the support ribs; and wherein said first and second support ribs maintain each of said azimuth posts perpendicular to the floor of said base or ceiling of said cover of the tape cassette.

\* \* \* \* \*